(12) United States Patent
Liao et al.

(10) Patent No.: US 8,912,561 B2
(45) Date of Patent: Dec. 16, 2014

(54) PHOSPHOR COMPOSITION AND LIGHT EMITTING DIODE DEVICE USING THE SAME

(71) Applicant: Lextar Electronics Corporation, Hsinchu (TW)

(72) Inventors: Yong-Hong Liao, Taichung (TW); Yun-Yi Tien, Hsinchu (TW); Jian-Chin Liang, Hsinchu (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 13/960,851

(22) Filed: Aug. 7, 2013

(65) Prior Publication Data

US 2014/0138723 A1    May 22, 2014

(30) Foreign Application Priority Data

Nov. 21, 2012    (TW) .............................. 101143476 A

(51) Int. Cl.
*C09K 11/77*    (2006.01)
*C09K 11/65*    (2006.01)
*H05B 33/10*    (2006.01)
*C09K 11/02*    (2006.01)

(52) U.S. Cl.
CPC ............ *C09K 11/7783* (2013.01); *H05B 33/10* (2013.01); *C09K 11/7728* (2013.01); *C09K 11/7759* (2013.01); *C09K 11/7766* (2013.01); *C09K 11/02* (2013.01); *C09K 11/65* (2013.01)
USPC ......................................................... 257/98

(58) Field of Classification Search
CPC ..... H01L 33/50; H01L 33/501; H01L 33/502; H01L 33/504; H01L 2933/0041

USPC .......... 257/E33.061, E33.059, 100, E23.116, 257/E31.117, E33.06; 427/212, 255.14; 252/500, 519.33, 301.36, 301.4 R; 428/690, 917; 250/483.1
See application file for complete search history.

(56) References Cited

U.S. PATENT DOCUMENTS

| 7,078,732 B1 | 7/2006 | Reeh et al. | |
|---|---|---|---|
| 2006/0082288 A1* | 4/2006 | Menkara et al. | 313/503 |
| 2009/0085049 A1 | 4/2009 | Kolodin et al. | |
| 2010/0181585 A1 | 7/2010 | Juestel et al. | |
| 2010/0259156 A1 | 10/2010 | Winkler et al. | |
| 2012/0037850 A1 | 2/2012 | Lee et al. | |

FOREIGN PATENT DOCUMENTS

| CN | 101701151 A | 5/2010 |
|---|---|---|
| EP | 1568732 A1 | 8/2005 |
| JP | 07078683 | 3/1995 |
| JP | 2003041247 | 2/2003 |
| JP | 2011111506 | 6/2011 |

(Continued)

OTHER PUBLICATIONS

English Abstract of TWI263360 (Published Oct. 1, 2006).
EPO Search Report dated Dec. 18, 2013.
TW Office Action dated Apr. 3, 2014.
Full English (machine) translation of CN101701151 (Published May 5, 2010).

(Continued)

*Primary Examiner* — Whitney T Moore
(74) *Attorney, Agent, or Firm* — McClure, Qualey & Rodack, LLP

(57) ABSTRACT

A phosphor composition is provided. The phosphor composition comprises a phosphor nucleus and a hydrophobic layer. The hydrophobic layer is bonded on a surface of the phosphor nucleus and consists of an organic compound with a hydrophobic functional group.

16 Claims, 2 Drawing Sheets

(56) References Cited

FOREIGN PATENT DOCUMENTS

| | | |
|---|---|---|
| JP | 2012201707 | 10/2012 |
| TW | I263360 | 10/2006 |
| WO | 2011142770 | 11/2011 |
| WO | 2011142880 | 11/2011 |

OTHER PUBLICATIONS

JP Office Action dated Sep. 30, 2014.
English Abstract of JP2011111506 (Published Jun. 9, 2011).
English Abstract of JP2012201707 (Published Oct. 22, 2012).
English Abstract of JP2003041247 (Published Feb. 13, 2003).
English Abstract of JP07078683 (Published Mar. 20, 1995).

* cited by examiner

PHOSPHOR COMPOSITION AND LIGHT EMITTING DIODE DEVICE USING THE SAME

This application claims the benefit of Taiwan application Serial No. 101143476, filed Nov. 21, 2012, the subject matter of which is incorporated herein by reference.

BACKGROUND OF THE INVENTION

1. Field of the Invention

The invention relates in general to a light emitting structure, and more particularly to a phosphor composition and a light emitting diode (LED) device using the same.

2. Description of the Related Art

The light emitting structure which emits a light using the properties of phosphors has been used for decades, and more than 30 varieties of phosphors have been developed and put into use. In recent years, the phosphors formed by rare earth oxides with high quantum efficiency and chemical stability have been widely used in the illumination and display industries and its significance goes without saying. The commonly used rare earth phosphors include yttrium aluminum garnet (YAG, $Y_3Al_5O_{12}$) phosphor and terbium aluminum garnet (TAG, $Tb_3Al_5O_{12}$) phosphor.

In the field of light emitting diode (LED), phosphor is used for emitting a white light by exciting a yellow phosphor with a high-brightness blue light LED or exciting a red phosphor and a green phosphor with a high-brightness blue light LED. Or, the red, the green, and the blue phosphors can be excited with a UV-light LED to generate a white light. However, in an environment of high temperature and high humidity, phosphors are susceptible to the influence of temperature and humidity, and problems such as color shift and shortened lifespan may occur and affect the emission efficiency of the white light LED device and result in color shift.

SUMMARY OF THE INVENTION

The invention is directed to a phosphor composition and a light emitting diode (LED) device using the same for increasing reliability.

According to an embodiment of the present invention, a phosphor composition is provided. The phosphor composition comprises a phosphor nucleus and a hydrophobic layer. The hydrophobic layer is bonded on a surface of the phosphor nucleus and consists of an organic compound with a hydrophobic functional group.

According to another embodiment of the present invention, a light emitting diode (LED) device is provided. The LED device comprises an LED chip and a phosphor composition. The LED chip emits a first light with wavelength λ1. The phosphor composition comprises a phosphor nucleus and a hydrophobic layer. The hydrophobic layer is bonded on a surface of the phosphor nucleus and consists of an organic compound with a hydrophobic functional group. The phosphor composition, being irradiated by the light with wavelength λ1, emits a second light with wavelength λ2 mixed with the first light to form a white light spectrum, wherein λ2>λ1.

The above and other aspects of the invention will become better understood with regard to the following detailed description of the preferred but non-limiting embodiments. The following description is made with reference to the accompanying drawings.

DETAILED DESCRIPTION OF THE INVENTION

According to a phosphor composition of the present embodiment and an LED device using the same, a surface of the phosphor nucleus is modified with a hydrophobic functional group to increase the reliability. For example, the modified surface of the phosphor composition has a hydrophobic layer, which avoids the phosphor composition deteriorating easily in an environment of high temperature and high humidity, and reducing the sensitivity of the phosphor composition to temperature and humidity. Therefore, when the phosphor composition is used in an environment of high temperature and high humidity, the phosphor composition has better temperature stability, higher humidity resistance, and longer lifespan. Moreover, when the phosphor composition is used in the packaging of LED, the molecules of the modified phosphor composition do not cluster easily, and can be uniformly distributed to provide higher stability and reduce color shift and light decay. Therefore, the brightness of the LED device decays imperceptively even after a long duration of use, and the color tone of the light emitted by the LED device is less likely to be shifted.

A number of embodiments are disclosed below for elaborating the invention. However, the embodiments of the invention are for detailed descriptions only, not for limiting the scope of protection of the invention.

The phosphor composition of the present embodiment can be formed by the solid-state reaction method or the sol-gel method, and then can be further grinded into phosphor powders whose particle size is micrometer level or nanometer level. The surface of the phosphor nucleus and an organic compound with a hydrophobic functional group can be combined to form a phosphor composition.

Figure 1:
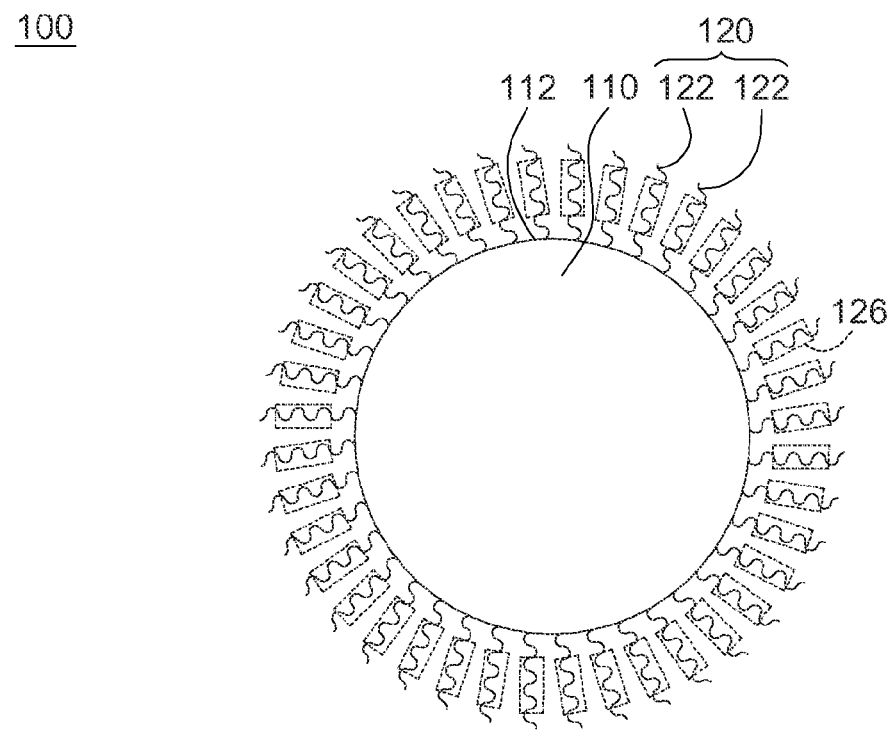
FIG. 1 shows a schematic diagram of a phosphor composition according to an embodiment of the invention.

Referring to FIG. 1, a schematic diagram of a phosphor composition 100 according to an embodiment of the invention is shown. The phosphor composition 100 comprises a phosphor nucleus 110 and a hydrophobic layer 120. The hydrophobic layer 120 is bonded on a surface 112 of the phosphor nucleus 110 and consists of an organic compound 122 with a hydrophobic functional group 126. For example, the hydrophobic layer 120 is an alkylsilyl halide with a $C_nF_{2n+1}$ functional group whose chemical formula can be expressed as: $C_nF_{2n+1}C_2H_4Si(OC_mH_{2m+1})_3$, wherein 4≤n≤16, 0≤m≤4, and n, m are integers. In the present embodiment, the hydrophobic functional group 126 is realized by the $C_nF_{2n+1}$ functional group, such that the modified phosphor composition 100 can be used in an environment of high temperature and high humidity.

Figure 2:
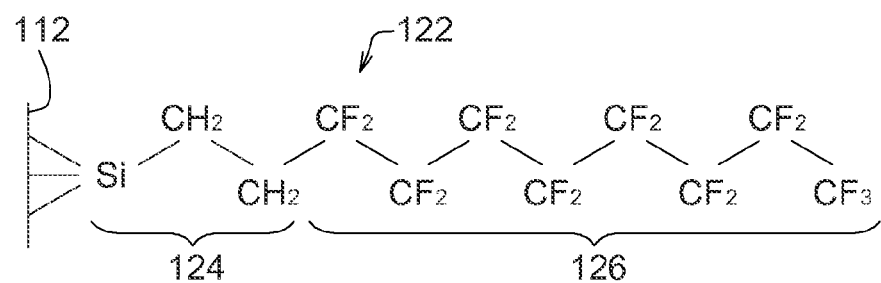
FIG. 2 shows a molecular structural diagram of alkylsilyl halide according to an embodiment of the invention.

Referring to FIG. 2, a molecular structural diagram of alkylsilyl halide according to an embodiment of the invention is shown. In the present embodiment, the alkylsilyl halide is an organic silicon compound. One end of the alkylsilyl halide reacts with phosphor through silane 124 to be bonded on the surface 112 of the phosphor nucleus 110; the other end away from the surface of the phosphor nucleus 110 is realized by a hydrophobic functional group 126, such that the hydrophilic functional group of the phosphor nucleus 110 does not contact water molecules in the environment easily and the humidity resistance of the phosphor nucleus 110 can be increased.

Details of the method of forming the hydrophobic layer 120 on the phosphor nucleus 110 are disclosed below. A powdered fluorescent material is distributed in an organic solvent (such as ethanol) containing alkylsilyl halide and a catalyst and then is heated and refluxed such that the alkylsilyl halide can be bonded on the surface 112 of the phosphor nucleus 110. After the fluorescent material is cooled, the fluorescent material is further filtered and cleaned with an organic solvent. Then, a 150° C. heat treatment is applied on the fluorescent material to obtain a hydrophobic layer 120 bonded on a surface of the phosphor nucleus 110. Preferably, the alkylsilyl halide of the present embodiment is 1H, 1H, 2H, 2H-perfluoro-octylethyltrimethoxy silane.

In the above embodiment, the hydrophobic layer 120 is formed by the alkylsilyl halide. In another embodiment, the hydrophobic layer 120 is formed by a haloalkene compound with a hydrophobic functional group. The haloalkene compound can use an organic compound, such as poly(tetrafluoroethylene) (PTFE), as a reaction gas, and can be directly coated on the surface 112 of the phosphor nucleus 110 such that the hydrophilic functional group of the phosphor nucleus 110 does not easily contact water molecules in the environment and the humidity resistance of the phosphor nucleus 110 can be increased.

The hydrophobic layer 120 disclosed above is a nanometer level organic compound 122 whose thickness is not larger than 10 nanometers, for example. Preferably, the thickness of the hydrophobic layer 120 ranges between 0.1~3 nanometers.

The phosphor nucleus 110 of the present embodiment can be selected from one or a combination of the groups consisting of the following compounds whose chemical formulas are expressed as follows $$Ca_{1-x}Al_{x-xy}Si_{1-x+xy}N_{2-x-xy}C_{xy}:A; \quad (1)$$

$$Ca_{1-x-z}Na_zM(III)_{x-xy-z}Si_{1-x+xy+z}N_{2-x-xy}C_{xy}:A; \quad (2)$$

$$M(II)_{1-x-z}M(I)_zM(III)_{x-xy-z}Si_{1-x+xy+z}N_{2-x-xy}C_{xy}:A; \quad (3)$$

$$M(II)_{1-x-z}M(I)_zM(III)_{x-xy-z}Si_{1-x+xy+z}N_{2-x-xy-2w/3}C_{xy}O_{w-v/2}H_v:A; \quad (4)$$

$$M(II)_{1-x-z}M(I)_zM(III)_{x-xy-z}Si_{1-x+xy+z}N_{2-x-xy-2w/3-v/3}C_{xy}O_wH_v:A; \quad (5)$$

wherein 0<x<1, 0<y<1, 0≤z<1, 0≤v<1, 0<w<1, x+z<1, x>xy+z and 0<x−xy−z<1,

M(I) is at least a univalent positive ion which comprises a metal ion such as Li, Na, K, Rb, Cu, Ag or Au;

M(II) is at least a divalent positive ion which comprises a metal ion such as Be, Mg, Ca, Sr, Ba, Cu, Co, Ni, Pd or Zn;

M(III) is at least a trivalent positive ion which comprises a metal ion such as B, Al, Ga, In, Sc, Y, La or Gd;

H is at least a univalent negative ion which comprises a halogen ion such as F, Cl, Br or I;

A is selected from activators consisting of metal ions which comprises at least a metal ion such as Ce, Pr, Nd, Sm, Eu, Gd, Tb, Dy, Ho, Er, Tm, Yb, Lu, Mn, Bi or Sb.

Besides, the phosphor nucleus 110 of the present embodiment can be selected from one or a combination of the groups consisting of the following compounds whose chemical formulas are expressed as follows:

$$M(II)_aSi_bO_cN_dC_e:A, \text{ wherein } 6<a<8, 8<b<14, 13<c<17, 5<d<9, 0<e<2; \quad (1)$$

$$M(II)_7Al_{12-x-y}Si_{x+y}O_{25-x}N_{x-y}C_y:A, \text{ wherein } 0<x\le12, 0<y<x, 0<x+y\le12; \quad (2)$$

$$M(II)_7M(III)_{12-x-y}Si_{x+y}O_{25-x}N_{x-y}C_y:A, \text{ wherein } 0<x\le12, 0<y<x, 0<x+y\le12; \quad (3)$$

$$M(II)_7M(III)_{12-x-y}Si_{x+y}O_{25-x\pm3\delta/2}N_{x\mp\delta-y}C_y:A, \text{ wherein } 0<x<12, 0\le y<x, 0<x+y\le12, 0<\delta\le3, \delta<x+y; \quad (4)$$

$$M(II)_7M(III)_{12-x-y}Si_{x+y}O_{25-x\pm\delta/2}N_{x\mp\delta-y}C_{y\pm\delta/2}:A, \text{ wherein } 0<x<12, 0\le y<x, 0<x+y\le12, 0<\delta\le3, \delta<x+y; \quad (5)$$

$$M(II)_{7-y}M(I)_yM(III)_{12-x-y}Si_{x+y+z}O_{25-x\pm3\delta/2}N_{x\mp\delta-z}C_z: A, \text{ wherein } 0<x<12, 0\le y<x, 0<z<x, 0<x+y+z\le12, z<x+\delta, 0<\delta\le3; \quad (6)$$

$$M(II)_{7-y}M(I)_yM(III)_{12-x-y-z}Si_{x+y+z}O_{25-x\pm\delta/2}N_{x\mp\delta-z}C_{z\pm\delta/2}:A, \text{ wherein } 0<x<12, 0\le y<x, 0<z<x, 0<x+y+z\le12, z<x+\delta, 0<\delta\le3; \quad (7)$$

$$M(II)_{7-y}M(I)_yM(III)_{12-x-y-z}Si_{x+y+z}O_{25-z\pm3\delta/2-v/2}N_{x\mp\delta-z}C_zH_v:A, \text{ wherein } 0<x<12, 0\le y<1, 0<z<x, z<x+\delta, 0<\delta\le3, 0\le v<1, 0<x+y+z\le12; \text{ and} \quad (8)$$

$$M(II)_{7-y}M(I)_yM(III)_{12-x-y-z}Si_{x+y+z}O_{25-x\pm\delta/2-v/2}N_{x\mp\delta-z}C_{z\pm\delta/2}H_v:A, \text{ wherein } 0<x<12, 0\le y<1, 0<z<x, z<x+\delta, 0<\delta\le3, 0\le v<1, 0<x+y+z\le12; \text{ wherein} \quad (9)$$

M(I) is at least a univalent positive ion which comprises a metal ion such as Li, Na, K, Rb, Cu, Ag or Au;

M(II) is at least a divalent positive ion which comprises a metal ion such as Be, Mg, Ca, Sr, Ba, Cu, Co, Ni, Pd or Zn;

M(III) is at least a trivalent positive ion which comprises a metal ion such as B, Al, Ga, In, Sc, Y, La or Gd;

H is at least a univalent negative ion which comprises a halogen ion such as F, Cl, Br or I;

A is selected from activators consisting of metal ions which comprises at least a metal ion such as Ce, Pr, Nd, Sm, Eu, Gd, Tb, Dy, Ho, Er, Tm, Yb, Lu, Mn, Bi or Sb.

The phosphor composition 100 is used in an LED device to generate a luminescence spectrum. For example, the LED device emits a first light with wavelength λ1 as an excited light irradiating the phosphor composition 100. The phosphor composition 100, having been irradiated by the first light with wavelength λ1, emits a second light with wavelength λ2, wherein λ2>λ1. If the LED device emits a blue light whose wavelength ranges between 445~475 nanometers to excite a yellow phosphor composition, the blue light and the yellow light can be mixed to produce a white light spectrum. If the LED device emits a UV light whose wavelength ranges between wavelength 430~350 nanometers to excite a red, a green, and a blue phosphor composition, the red light, the green light and the blue light can be mixed to produce a white light spectrum.

Figure 3A:
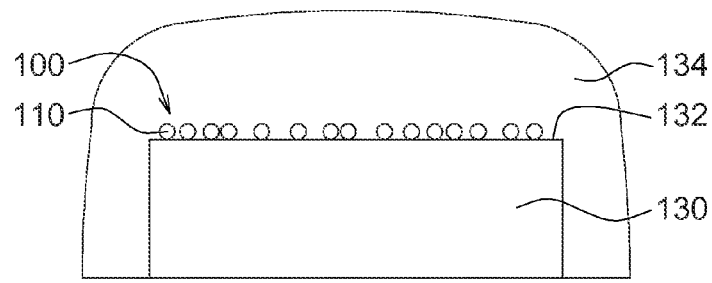
FIGS. 3A~3C show schematic diagrams of an LED device according to an embodiment of the invention.
Figure 3B:
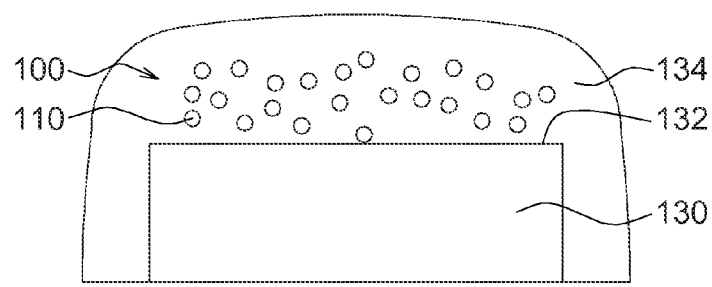
Figure 3C:
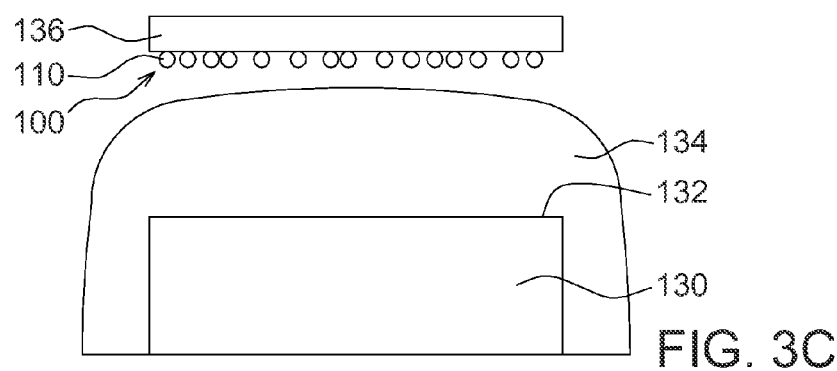

Referring to FIGS. 3A~3C, schematic diagrams of an LED devices 140~142 according to an embodiment of the invention are shown. The LED device 140 comprises an LED chip 130, a colloid 134 and a phosphor composition 100 (only the phosphor nucleus 110 is illustrated, and the hydrophobic layer 120 bonded on a surface of the phosphor nucleus 110 is not illustrated). The LED chip 130 is a blue light chip, for example. The phosphor composition 100 located above a light emitting surface 132 of the LED chip 130 absorbs light energy to enter an excited state and is immediately de-excited to emit a fluorescent light. As indicated in FIG. 3A, the phosphor composition 100 can be directly coated on the surface 132 of the LED chip 130, and then is encapsulated with the colloid 134. As indicated in FIG. 3B, the phosphor composition 100 can be mixed in the colloid 134d used for packaging the LED chip 130, and then the surface 132 of the LED chip 130 is covered by the colloid 134. As indicated in FIG. 3C, the phosphor composition 100 can be coated on a plate 136 located above the light emitting surface 132 of the LED chip 130. The plate 136 is a diffuser, a condensing lens, a lens, a prism or a filter, and the invention does not have particular restrictions regarding the varieties of the plate 136.

Besides, the colloid 134 can be a resin such as epoxy or silicone. The colloid 134 can resist the penetration of moisture or heat, such that the phosphor composition 100 mixed in the colloid 134 can be used in an environment of high temperature and high humidity.

As indicated in FIG. 1, the organic compound 122 with a hydrophobic functional group 126 is bonded on the surface 112 of the phosphor nucleus 110, the molecules of the phosphors mixed in the colloid 134 of the present embodiment do not cluster easily and can be uniformly distributed to provide higher stability and reduce color shift and light decay. Therefore, the brightness of the LED device of the present embodiment decays unapparently after a long duration of use, and the color tone of the light emitted by the LED device is less likely to be shifted.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A phosphor composition, comprising:
   a phosphor nucleus, and
   a hydrophobic layer bonded on a surface of the phosphor nucleus and consisting of an organic compound with a hydrophobic functional group, wherein the organic compound consists of alkylsilyl halide.

2. The phosphor composition according to claim 1, wherein a chemical formula of the alkylsilyl halide is expressed as: $C_nF_{2n+1}C_2H_4Si(OC_mH_{2m+1})_3$, $4 \leq n \leq 16$, $0 \leq m \leq 4$, and n, m are integers.

3. The phosphor composition according to claim 1, wherein a thickness of the hydrophobic layer is not larger than 10 nanometers.

4. The phosphor composition according to claim 3, wherein a thickness of the hydrophobic layer ranges between 0.1~3 nanometers.

5. The phosphor composition according to claim 1, wherein the phosphor nucleus is selected from one or a combination of the groups consisting of the following compounds whose chemical formulas are expressed as:

$Ca_{1-x}Al_{x-xy}Si_{1-x+xy}N_{2-x-xy}C_{xy}$:A; (1)

$Ca_{1-x-z}Na_zM(III)_{x-xy-z}Si_{1-x+xy+z}N_{2-x-xy}C_{xy}$:A; (2)

$M(II)_{1-x-z}M(I)_zM(III)_{x-xy-z}Si_{1-x+xy+z}N_{2-x-xy}C_{xy}$:A; (3)

$M(II)_{1-x-z}M(I)_zM(III)_{x-xy-z}Si_{1-x+xy+z}N_{2-x-xy-2w/3}C_{xy}O_{w-w/2}H_v$:A; (4)

$M(II)_{1-x-z}M(I)_zM(III)_{x-xy-z}Si_{1-x+xy+z}N_{2-x-xy-2w/3-v/3}C_{xy}O_wH_v$:A; wherein (5)

$0<x<1, 0<y<1, 0 \leq z<1, 0 \leq v<1, 0<w<1, x+z<1, x>xy+z$ and $0<x-xy-z<1$,

M(I) is at least a univalent positive ion which comprises a metal ion being Li, Na, K, Rb, Cu, Ag or Au;
M(II) is at least a divalent positive ion which comprises a metal ion being Be, Mg, Ca, Sr, Ba, Cu, Co, Ni, Pd or Zn;
M(III) is at least a trivalent positive ion which comprises a metal ion being B, Al, Ga, In, Sc, Y, La or Gd;
H is at least a univalent negative ion which comprises a metal ion being F, Cl, Br or I;
A is selected from activators consisting of a metal ion being Ce, Pr, Nd, Sm, Eu, Gd, Tb, Dy, Ho, Er, Tm, Yb, Lu, Mn, Bi or Sb.

6. The phosphor composition according to claim 1, wherein the phosphor nucleus is selected from one or a combination of the groups consisting of the following compounds whose chemical formulas are expressed as:

$M(II)_aSi_bO_cN_dC_e$:A, wherein $6<a<8$, $8<b<14$, $13<c<17$, $5<d<9$, $0<e<2$; (1)

$M(II)_7Al_{12-x-y}Si_{x+y}O_{25-x}N_{x-y}C_y$:A, wherein $0<x \leq 12$, $0<y<x$, $0<x+y \leq 12$; (2)

$M(II)_7M(II)_{12-x-y}Si_{x+y}O_{25-x}N_{x-y}C_y$:A, wherein $0<x \leq 12$, $0<y<x$, $0<x+y \leq 12$; (3)

$M(II)_7M(II)_{12-x-y}Si_{x+y}O_{25-x \pm 3\delta/2}N_{x \mp \delta-y}C_y$:A, wherein $0<x<12$, $0 \leq y<x$, $0<x+y \leq 12$, $0<\delta \leq 3$, $\delta<x+y$; (4)

$M(II)_7M(III)_{12-x-y}Si_{x+y}O_{25-x \pm \delta/2}N_{x \mp \delta-y}C_{y \pm \delta/2}$:A, wherein $0<x<12$, $0 \leq y<x$, $0<x+y \leq 12$, $0<\delta \leq 3$, $\delta<x+y$; (5)

$M(II)_{7-y}M(I)_yM(III)_{12-x-y-z}Si_{x+y+z}O_{25-x \pm 3\delta/2}N_{x \mp \delta-z}C_z$: A, wherein $0<x<12$, $0 \leq y<x$, $0<z<x$, $0<x+y+z \leq 12$, $z<x+\delta$, $0<\delta \leq 3$; (6)

$M(II)_{7-y}M(I)_yM(III)_{12-x-y-z}Si_{x+y+z}O_{25-x \pm \delta/2}N_{x \mp \delta-z}C_{z \pm \delta/2}$:A, wherein $0<x<12$, $0 \leq y<x$, $0<z<x$, $0<x+y+z \leq 12$, $z<x+\delta$, $0<\delta \leq 3$; (7)

$M(II)_{7-y}M(I)_yM(III)_{12-x-y-z}Si_{x+y+z}O_{25-x \pm \delta/2-v/2}N_{x \mp \delta-z}C_zH_v$:A, wherein $0<x<12$, $0 \leq y<1$, $0<z<x$, $z<x+\delta$, $0<\delta \leq 3$, $0 \leq v<1$, $0<x+y+z \leq 12$; and (8)

$M(II)_{7-y}M(I)_yM(III)_{12-x-y-z}Si_{x+y+z}O_{25-x \pm \delta/2-v2}N_{x \mp \delta-z}C_{z \pm \delta/2}H_v$:A, wherein $0<x<12$, $0 \leq y<1$, $0<z<x$, $z<x+\delta$, $0<\delta \leq 3$, $0 \leq v<1$, $0<x+y+z \leq 12$; wherein (9)

M(I) is at least a univalent positive ion which comprises a metal ion being Li, Na, K, Rb, Cu, Ag or Au;
M(II) is at least a divalent positive ion which comprises a metal ion being Be, Mg, Ca, Sr, Ba, Cu, Co, Ni, Pd or Zn;
M(III) is at least a trivalent positive ion which comprises a metal ion being B, Al, Ga, In, Sc, Y, La or Gd;
H is at least a univalent negative ion which comprises a metal ion being F, Cl, Br or I;
A is selected from activators consisting of a metal ion being Ce, Pr, Nd, Sm, Eu, Gd, Tb, Dy, Ho, Er, Tm, Yb, Lu, Mn, Bi or Sb.

7. A light emitting diode (LED) device, comprising:
an LED chip for emitting a first light with wavelength λ1; and
a phosphor composition comprising a phosphor nucleus and a hydrophobic layer, wherein the hydrophobic layer is bonded on a surface of the phosphor nucleus and consists of an organic compound with a hydrophobic functional group, wherein the organic compound consists of alkylsilyl halide, and the phosphor composition, being irradiated by the first light with wavelength λ1, emits a second light with wavelength λ2 mixed with the first light with wavelength λ1 to form a white light spectrum, and λ2>λ1.

8. The LED device according to claim 7, wherein the phosphor composition is located above a light emitting surface of the LED chip.

9. The LED device according to claim 8, wherein the phosphor composition is directly coated on a surface of the LED chip, mixed in a colloid sued for packaging the LED chip or coated on a plate located above a light emitting surface of the LED chip.

10. The LED device according to claim 9, wherein the colloid can be formed by epoxy or silicone.

11. The LED device according to claim 7, wherein a chemical formula of the alkylsilyl halide is expressed as: $C_nF_{2n+1}C_2H_4Si(OC_mH_{2m+1})_3$, $4 \leq n \leq 16$, $0 \leq m \leq 4$, and n, m are integers.

12. The LED device according to claim 7, wherein a thickness of the organic compound is not larger than 10 nanometers.

13. The LED device according to claim 12, wherein a thickness of the organic compound is between 0.1~3 nanometers.

14. The LED device according to claim 7, wherein the phosphor nucleus is selected from one or a combination of the groups consisting of the following compounds whose chemical formulas are expressed as:

$$Ca_{1-x}Al_{x-xy}Si_{1-x+xy}N_{2-x-xy}C_{xy}:A; \quad (1)$$

$$Ca_{1-x-z}Na_zM(III)_{x-xy-z}Si_{1-x+xy+z}N_{2-x-xy}C_{xy}:A; \quad (2)$$

$$M(II)_{1-x-z}M(I)_zM(III)_{x-xy-z}Si_{1-x+xy+z}N_{2-x-xy}C_{xy}:A; \quad (3)$$

$$M(II)_{1-x-z}M(I)_zM(III)_{x-xy-z}Si_{1-x+xy+z}N_{2-x-xy-2w/3}C_{xy}O_{w-v2}H_v:A; \quad (4)$$

$$M(II)_{1-x-z}M(I)_zM(III)_{x-xy-z}Si_{1-x+xy+z}N_{2-x-xy-2w/3-v/3}C_{xy}O_wH_v:A; \text{ wherein} \quad (5)$$

$0<x<1, 0<y<1, 0 \leq z<1, 0 \leq v<1, 0<w<1, x+z<1, x>xy+z$ and $0<x-xy-z<1$,

M(I) is at least a univalent positive ion which comprises a metal ion being Li, Na, K, Rb, Cu, Ag or Au;

M(II) is at least a divalent positive ion which comprises a metal ion being Be, Mg, Ca, Sr, Ba, Cu, Co, Ni, Pd or Zn;

M(III) is at least a trivalent positive ion which comprises a metal ion such as B, Al, Ga, In, Sc, Y, La or Gd;

H is at least a univalent negative ion which comprises a halogen ion being F, Cl, Br or I;

A is selected from activators consisting of metal ions which comprises at least a metal ion being Ce, Pr, Nd, Sm, Eu, Gd, Tb, Dy, Ho, Er, Tm, Yb, Lu, Mn, Bi or Sb.

15. The LED device according to claim 7, wherein the phosphor nucleus is selected from one or a combination of the groups consisting of the following compounds whose chemical formulas are expressed as:

$$M(II)_aSi_bO_cN_dC_eA, \text{ wherein } 6<a<8, 8<b<14, 13<c<17, 5<d<9, 0<e<2; \quad (1)$$

$$M(II)_7Al_{12-x-y}Si_{x+y}O_{25-x}N_{x-y}C_y:A, \text{ wherein } 0<x \leq 12, 0<y<x, 0<x+y \leq 12; \quad (2)$$

$$M(II)_7M(II)_{12-x-y}Si_{x+y}O_{25-x}N_{x-y}C_y:A, \text{ wherein } 0<x \leq 12, 0<y<x, 0<x+y \leq 12; \quad (3)$$

$$M(II)_7M(II)_{12-x-y}Si_{x+y}O_{25-x \pm \delta/2}N_{x \mp \delta-y}C_y:A, \text{ wherein } 0<x<12, 0<y<x, 0<x+y \leq 12, 0<\delta \leq 3, \delta<x+y; \quad (4)$$

$$M(II)_7M(III)_{12-x-y}Si_{x+y}O_{25-x \pm \delta/2}N_{x \mp \delta-y}C_{y \pm \delta/2}:A, \text{ wherein } 0<x<12, 0 \leq y<x, 0<x+y \leq 12, 0<\delta \leq 3, \delta<x+y; \quad (5)$$

$$M(II)_{7-y}M(I)_yM(1)_{12-x-y}Si_{x+y+z}O_{25-x \pm 3\delta/2}N_{x \mp \delta-z}C_zA, \text{ wherein } 0<x<12, 0 \leq y<x, 0<z<x, 0<x+y+z \leq 12, z<x+\delta, 0<\delta \leq 3; \quad (6)$$

$$M(II)_{7-y}M(I)_yM(III)_{12-x-y-z}Si_{x+y+z}O_{25-x \pm \delta/2}N_{x \mp \delta-z}C_{z \pm \delta/2}:A, \text{ wherein } 0<x<12, 0 \leq y<x, 0<z<x, 0<x+y+z \leq 12, z<x+\delta, 0<63; \quad (7)$$

$$M(II)_{7-y}M(I)_yM(III)_{12-x-y-z}Si_{x+y+z}O_{25-x \pm \delta/2-v/2}N_{x \mp \delta-z}C_zH_vA, \text{ wherein } 0<x<12, 0 \leq y<1, 0<z<x, z<x+\delta, 0<\delta \leq 3, 0 \leq v<1, 0<x+y+z \leq 12; \text{ and} \quad (8)$$

$$M(II)_{7-y}M(I)_yM(III)_{12-x-y-z}Si_{x+y+z}O_{25-x \pm \delta/2-v/2}N_{x \mp \delta-z}C_{z \pm \delta/2}H_v:A, \text{ wherein } 0<x<12, 0 \leq y<1, 0<z<x, z<x+\delta, 0<\delta \leq 3, 0 \leq v<1, 0<x+y+z \leq 12; \text{ wherein} \quad (9)$$

M(I) is at least a univalent positive ion which comprises a metal ion being Li, Na, K, Rb, Cu, Ag or Au;

M(II) is at least a divalent positive ion which comprises a metal ion being Be, Mg, Ca, Sr, Ba, Cu, Co, Ni, Pd or Zn;

M(III) is at least a trivalent positive ion which comprises a metal ion being B, Al, Ga, In, Sc, Y, La or Gd;

H is at least a univalent negative ion which comprises a halogen ion being F, Cl, Br or I;

A is selected from activators consisting of metal ions which comprises at least a metal ion being Ce, Pr, Nd, Sm, Eu, Gd, Tb, Dy, Ho, Er, Tm, Yb, Lu, Mn, Bi or Sb.

16. The LED device according to claim 7, wherein the LED chip is a blue light chip.

* * * * *